United States Patent Office 3,784,587
Patented Jan. 8, 1974

3,784,587
ADHESIVE COMPOSITION CONTAINING AN A-B-A BLOCK COPOLYMER, POLY ALPHA-METHYL STYRENE AND A TACKIFYING RESIN
Thomas G. Chambers, Akron, Ohio, assignor to The Goodyear Tire & Rubber Company, Akron, Ohio
No Drawing. Filed July 31, 1972, Ser. No. 276,805
Int. Cl. C08f 19/08
U.S. Cl. 260—876 B         8 Claims

ABSTRACT OF THE DISCLOSURE

A pressure-sensitive adhesive composition suitable for application as a hot melt, without a solvent, which comprises a mixture of (a) an unvulcanized elastomeric block copolymer having the general configuration A—B—A, where A is a non-elastomeric styrene polymer block and B is an elastomeric diene polymer block selected from isoprene and 1,3-butadiene, (b) a compatible thermoplastic tackifying resin containing carbon-to-carbon unsaturation and derived from hydrocarbons having 5 to 8 carbon atoms and (c) a poly($\alpha$-methylstyrene) characteristically having a viscosity at 60° C. in the range of about 100 to about 900 centipoises.

---

This invention relates to pressure-sensitive adhesives. The invention more particularly relates to pressure-sensitive adhesives which can be applied as hot melts without solvents.

Pressure-sensitive adhesives are highly useful for many commercial applications when they have good tack at ordinary temperatures, adhere to many types of substrates upon contact with essentially no pressure, are essentially free from cold flow and retain these desirable properties during prolonged periods of storage. The utility of such adhesives is particularly enhanced for preparation of coated substrates when they can be applied as hot melts without solvents.

Heretofore, pressure-sensitive adhesives have been prepared as mixtures of hydrocarbon-derived resins and block copolymers of styrene and isoprene or butadiene. However, such adhesive mixtures have had serious disadvantages for use as hot melt pressure-sensitive adhesives without solvents, because of their excessively high viscosities. Such a disadvantage prevents the use of such otherwise highly desirable adhesive mixtures for many relatively high speed and pollution-free commercial applications.

It is, therefore, an object of this invention to provide an adhesive suitable as a pressure-sensitive adhesive which can be applied as a hot melt without the aid of a solvent.

In accordance with this invention, it has been found unexpectedly that an adhesive composition comprises a mixture of (a) an unvulcanized elastomeric block copolymer having the general configuration A—B—A wherein each A is an independently selected non-elastomeric styrene polymer block having an average molecular weight of 2,000 to 100,000, the total block A content being from about 10 to about 50 percent by weight of the copolymer, and B is an elastomeric diene polymer block, selected from at least one of isoprene and 1,3-butadiene, having an average molecular weight from about 25,000 to about 1,000,000, said copolymer having a tensile strength at 25° C. in excess of about 200 pounds per square inch, (b) a compatible, thermoplastic tackifying resin containing carbon-to-carbon unsaturation therein and derived from hydrocarbons having 5 to 8 carbon atoms and at least one carbon-to-carbon double bond therein selected from aliphatic hydrocarbons and alicyclic hydrocarbons, and (c) a poly($\alpha$-methylstyrene) characteristically having a viscosity at 60° C. in the range of about 100 to about 1000, and preferably about 150 to about 900, centipoises.

It was a particular discovery of this invention that the poly($\alpha$ - methylstyrene) in admixture with the said unvulcanized block copolymer and hydrocarbon tackifying resin, uniquely provides an adhesive which can suitably be applied as a hot melt having a relatively low viscosity in the range of about 1000 to about 5500 centipoises at a temperature in the range of about 160° C. to about 180° C. without sacrificing the advantageous high performance adhesive properties of the admixture of block copolymer and tackifying resin. These viscosities are typical at 175° C.

It is preferred that the adhesive mixture of this invention, in order to exhibit high performance properties as a hot melt adhesive, comprises from about 20 to about 30, preferably about 22 to about 28, weight percent of the poly($\alpha$-methylstyrene), about 25 to about 35, preferably about 28 to about 33, weight percent of the unvulcanized block copolymer and from about 38 to about 53, preferably about 40 to about 50, weight percent of the thermoplastic hyrocarbon-derived tackifying resin.

In the practice of this invention, the adhesive compositions can conveniently be prepared by mixing the tackifying resin, elastomeric block copolymer and poly($\alpha$ - methylstyrene) at a temperature in the range of about 120° C. to about 180° C. It is preferred to first liquify the tackifying resin by heating to a temperature in the range of about 120° C. to about 180° C. and mixing therewith the poly($\alpha$-methylstyrene). It is then preferred to adjust the temperature of this mixture to a range of about 150° C. to about 180° C. and to mix the block copolymer therewith, accompanied by vigorous agitation in order to provide good mixing because of the mixture's increased viscosity. The molten adhesive composition can then be applied directly to a substrate as a hot melt at a temperature of about 140° C. to about 190° C. with the substrate temperature typically ranging from about 15° C. to about 50° C. The hot liquid composition, upon application to the substrate, particularly at ambient conditions (about 25° C.), typically sets up upon cooling and transforms into a soft pressure-sensitive adhesive within about 5 seconds.

Although the composition of this invention is uniquely applicable as a hot melt adhesive with high performance properties of good tack, peel strength and shear strength, it is understood that it can also be applied, if desired, from solution by mixing with a suitable solvent. Various solvents can be used for this purpose such as volatile organic hydrocarbons selected from aliphatic and aromatic hydrocarbons. Representative of the aromatic hydrocarbons are toluene and benzene and representative of the aliphatic hydrocarbons are pentane, hexane, heptane and octane. Such an adhesive mixture can be simply applied to a substrate surface and dried to form an adhesive.

The poly($\alpha$-methylstyrene) polymers for this invention can have various molecular weights and are conveniently characterized by their viscosities at about 60° C. in the range of about 100 to about 1000, and preferably about 150 to about 900, centipoises.

In the unvulcanized elastomeric block copolymer, it is preferred that the styrene polymer block has an average molecular weight of from about 5000 to about 30,000, that the elastomeric diene polymer block is a 1,4-addition polymer of a conjugated diene selected from isoprene and 1,3-butadiene, having an average molecular weight of from about 50,000 to about 150,000, and the total block A content is from about 10 to about 50 percent, more preferably from about 12 to about 30 percent by weight of the copolymer. It is especially preferred that the elastomeric conjugated diene polymer block is a 1,4-addition polymer of isoprene. The copolymer typically can have an intrinsic viscosity of from about 0.6 to about 1.5 as determined by 0.5 gram in 50 milliliters of toluene solution at 30° C.

The unvulcanized elastomeric block copolymer used in this invention comprises non-elastomeric terminal polymer blocks and internal elastomeric polymer blocks. The characteristics of the internal or middle block, which is elastomeric, may be that expressed in ASTM Special Technical Bulletin No. 184 as follows: "A substance that can be stretched at room temperature to at least twice its original length and, after having been stretched and the stress removed, returns with force to approximately its original length in a short time."

The terminal non-elastomeric blocks constitute polymeric blocks which do not meet this definition. Furthermore, the difference between glass transition temperatures of the end blocks and middle blocks should be at least 40° C. and preferably at least 100° C. It is preferred that the non-elastomeric styrene polymer block has a glass transition temperature above about 25° C. and that the elastomeric diene polymer block has a glass transition temperature below about 10° C.

Typically, the unvulcanized elastomeric copolymers can be prepared by first polymerizing styrene with a lithium based initiator. A suitable lithium based initiator is, for example, lithium metal, alkyl lithium compounds, lithium hydrocarbyls and organo lithium amides. The alkyl lithium compounds are preferred. Particularly preferred alkyl lithium compounds are branched chain, preferably secondary alkyl lithiums. Such alkyl lithium compounds especially include secondary butyl lithium, isobutyl lithium, isoamyl lithium and secondary amyl lithium.

After polymerizing the styrene to an average molecular weight of from about 2000 to about 100,000, and preferably from about 5000 to about 30,000, the conjugated diene and additional amounts of styrene are added to the polymerization mixture. Preferred conjugated dienes are the aliphatic conjugated dienes such as isoprene and 1,3-butadiene.

The polymerization then continues to provide an elastomeric middle block polymer of the conjugated diene having an average molecular weight of from about 25,000 to about 1,000,000, and more preferably between about 50,000 and about 500,000, followed by a non-elastomeric block polymer of the original type of monomer.

Typically, the preparation of the elastomeric block copolymer is made by polymerizing the monomers at temperatures in the order of about −20° C. to about 100° C., preferably between about 20° C. and about 65° C. in an inert hydrocarbon solvent such as an alpha olefin or aromatic hydrocarbon. Typically inert hydrocarbon solvents are aliphatic hydrocarbons (including cycloaliphatic) such as cyclohexane and a typical aromatic hydrocarbon is benzene. Usually the amount of initiator should be maintained as low as possible, but may be varied over a relatively wide range such as from about 1 to about 200 parts per million, based on the weight of the monomers present.

In the practice of this invention the thermoplastic tackifying resins preferably have a Ring and Ball softening point according to ASTM Method E28–58T of from about 50° C. to about 150° C., and more preferably from about 80° C. to about 130° C. They are derived from aliphatic and alicyclic hydrocarbons, preferably aliphatic hydrocarbons, and, therefore, contain essentially no units derived from aromatic hydrocarbons. In this regard, it is preferred that not more than about 5 percent by weight of the units of the tackifying resin are derived from aromatic hydrocarbons and more preferably it is desired that none of the units are derived from aromatic hydrocarbons. Furthermore, it is preferred that the tackifying resin contains carbon-to-carbon unsaturation therein. Therefore, it is preferred that at least a portion of the hydrocarbons used to prepare the resin have at least two carbon-to-carbon double bonds therein. As an indication of such unsaturation contained in the tackifying resin, it has been found that satisfactory resins have an iodine number according to ASTM Method D–1959–61 of from about 40 to about 150.

Various thermoplastic tackifying resins can be used in this invention such as, for example, resins derived by polymerizing unsaturated hydrocarbons obtained from petroleum fractions and processes related thereto. It is usually desired to copolymerize at least one unsaturated hydrocarbon having one double bond (monoolefin) with at least one unsaturated hydrocarbon having more than one double bond (diolefin). Various mole ratios of diolefins to monoolefins can be used such as from about 20:80 to about 80:20. Representative of various diolefins are aliphatic diolefins having from 4 to 8 and preferably from 4 to 6 carbon atoms, particularly the conjugated dienes such as 1,3-butadiene, 2-methyl-1,3-butadiene (isoprene), 2-ethyl-1,3-butadiene and 1,3-pentadiene (piperylene), and aliphatic cyclic diolefins such as cyclopentadiene and dicyclopentadiene. It is usually preferred that at least one of the double bonds is alpha to the first carbon atom. Representative of various monoolefins are aliphatic monoolefins having from 3 to 8, and preferably from 4 to 6 carbon atoms such as propylene, the various butenes, including 2-methyl-2-butene, the pentenes, the hexenes, the heptenes and the octenes, and cyclic aliphatic monoolefins having from 5 to 8 and preferably from 5 to 6 carbon atoms such as cyclopentene, cyclohexene, cycloheptene and cyclooctene.

The resins are generally prepared by polymerizing the unsaturated hydrocarbons in an inert volatile solvent or diluent in the presence of a suitable catalyst such as a Friedel-Crafts type catalyst, preferably selected from aluminum chloride, aluminum bromide, stannic chloride, boron trifluoride, boron trifluoride etherate and also alkyl aluminum halides such as isopropyl aluminum dichloride. Usually, for convenience, particulate anhydrous aluminum chloride is preferred.

In the preparation of the resins, a wide range of temperatures are suitable for the polymerizations. For example, the polymerizations can normally be carried out in the range of from about −20° C. to about 100° C. and usually more preferably from about 0° C. to about 50° C. but above the freezing point of the reaction system and below its boiling point. Certainly, the pressure at which the reaction is being conducted should be taken into consideration when determining the optimum temperature. Normally, the polymerization reaction pressures may be atmospheric or above or below atmospheric pressure. Generally, a satisfactory polymerization is conducted at about autogenous pressure developed under the operating conditions used.

Exemplary of a preferred thermoplastic tackifying resin for this invention comprises from about 20 to about 80 units derived from piperylene and correspondingly from about 80 to about 20 units derived from 2-methyl-2-butene. The tackifying resin typically has a softening point of from about 80° C. to about 110° C. The preparation of such a resin polymer is more fully described in U.S. Pat. No. 3,577,398. Such a resin polymer can be prepared, for example, by polymerizing a mixture comprising from about 20 to about 75 weight percent of piperylene and from about 80 to about 25 weight percent of 2-methyl-2-butene in the presence of an anhydrous catalyst such as aluminum chloride at a temperature of from about 0° C. to about 50° C. It is usually preferred to conduct the polymerization in an inert volatile organic solvent using aluminum chloride having a mesh size of from about 50 to about 200 U.S. Sieve size as the catalyst. The resin polymers can be modified by containing up to about 25 percent by weight units derived from piperylene dimers, piperylene trimers, and other unsaturated hydrocarbons containing from 4 to 6 carbon atoms such as butene and substituted butenes such as 2-methyl-1-butene, 2,3-dimethyl-1-butene, 2,3 - dimethyl-2 - butene, 3,3-dimethyl-1-butene; the pentenes and substituted pentenes such as 1-pentene, 2-pentene, 2-methyl-1-pentene, 2-methyl-2-pentene, 3-methyl-2-pentene, 4-methyl-1-pentene, 4-methyl-2-pentene; the hexenes such as 2-hexene; diolefins such as isoprene; and cyclic unsaturated hydrocarbons such as cyclopentene, cyclohexene and 1,3-cyclopentadiene.

In the preparation of the adhesives of this invention, it is understood that minor amounts of various antioxidants such as the amine and hindered phenol types as well as fillers and pigments can be added and mixed therewith in order to further improve its aging characteristics and various physical properties.

The following examples further illustrate the invention and are not intended to be limiting. In these examples the parts and percentages are by weight unless otherwise indicated.

EXAMPLE I

A thermoplastic tackifying resin was prepared by the following method:

To a reactor was charged 200 parts of heptane and 6 parts of anhydrous aluminum chloride at a temperature of about 25° C. While continuously stirring the mixture, 400 parts of a hydrocarbon mixture containing unsaturated hydrocarbons was slowly added to the reactor over a period of about 90 minutes. The temperature of the reaction was thereafter maintained in a range of about 25° C. to about 30° C. for about 60 minutes. The hydrocarbon mixture had the following composition:

| Component: | Parts |
|---|---|
| 2-pentene | 5.1 |
| 2-methyl-2-butene | 32.9 |
| Isoprene | 3.1 |
| 1,3-pentadiene (piperylene) | 27.5 |
| 2,3-dimethyl-1-butene | 2.1 |
| 4-methyl-2-pentene | 19.4 |
| Unsaturated hydrocarbons containing 5–6 carbon atoms | 10.5 |
| | 100.6 |

After this polymerization, 25 parts of water, 8 parts of particulate hydrated calcium hydroxide and 8 parts of Attapulgus clay were added to the polymerizate. Agitation was provided to suspend the hydrated calcium hydroxide and clay at about 90° C. and continued for about 120 minutes. The mixture was then filtered to remove the insoluble catalyst residue, excess calcium compound and clay. The filtrate was then steam distilled to a pot temperature of about 235° C. The resulting residual molten resin was poured from the reactor onto an aluminum tray and cooled to about 25° C. to form 173 parts of a hard brittle resin having a pale yellow color and having a softening point, according to ASTM Method E28–58T, of 94° C.

EXAMPLE II

A polystyrene-polyisoprene-polystyrene unvulcanized elastomeric block copolymer was prepared by the following method:

A solution was prepared consisting of 2 grams of styrene in a 20 milliliter solution of benzene. The solution was run through silica gel at about 25° C. to remove trace amounts of water and then sparged with dry nitrogen for about 30 seconds to remove trace amounts of air.

To the solution was added 0.2 millimoles of secondary butyl lithium in a 0.3 molar heptane solution. The mixture was allowed to polymerize and set aside for about 16 to 18 hours at about 25° C.

A solution was prepared consisting of 16 grams of isoprene and 2 grams of styrene in 80 milliliters of a benzene solution. The solution was run through silica gel at about 25° C. to remove traces of water and purged with dry nitrogen to remove trace amounts of air.

The mixture of isoprene, styrene and benzene was mixed with the original polymerized styrene mixture to the exclusion of air in a reactor. The reactor was sealed and placed in a heated liquid polymerization bath at about 50° C. for about 4 hours until about a 100 percent completion of the polymerization occurred.

The resulting polymer was coagulated with methyl alcohol containing a very small amount of a phenolic antioxidant and dried. The resulting polymer had an intrinsic viscosity of 1.12 in toluene at 30° C. It contained 18 percent by weight units derived from styrene.

A portion of the polymer was molded in the form of dumbbells at 138° C. The dumbbells had a thickness of 0.6 inch, a width of 0.1 inch at its narrow portion and a length of 0.8 inch. The dumbbells were tested on an Instron tester at 25° C. with a crosshead separation speed of 2 inches per minute. The tests indicated that the prepared block copolymer had an ultimate tensile strength of about 250 pounds per square inch at an elongation of 1500 percent.

Analyses indicated that the block copolymer had a molecular weight of about 100,000. Thus, assuming that the terminal polystyrene blocks were of equal molecular weight, the block copolymer comprised terminal polystyrene blocks having molecular weights of about 9000 and internal polyisoprene having a molecular weight of about 82,000.

EXAMPLE III

Mixtures of poly($\alpha$-methylstyrene) with a tackifying resin prepared according to Example I and a polystyrene-polyisoprene-polystyrene block copolymer, obtained as Kraton 1107 from the Shell Chemical Company, were prepared. The poly($\alpha$-methylstyrene) had a viscosity at 60° C. of about 170 centipoises. The block copolymer was similar to the copolymer prepared according to Example II. It contained about 12 percent styrene by weight, a glass transition temperature of about −70° C. and a tensile strength of about 1200 pounds per square inch with an elongation of about 1300 percent measured at 25° C., according to the method used in Example II. The copolymer had an intrinsic viscosity of 1.1 as measured in toluene at 30° C.

The mixtures of poly($\alpha$-methylstyrene), tackifying resin and block copolymer were prepared without a solvent by the following method:

Various amounts of a hydrocarbon-derived tackifying resin containing unsaturation therein of the type prepared according to Example I and having a Ring and Ball softening point of about 100° C. (ASTM E28–58T, were heated to about 150° C. To the heated and liquified resin was then added various amounts of the poly($\alpha$-methylstyrene). This mixture was heated to about 163° C. and the non-vulcanized block copolymer added with vigorous agitation.

The mixtures were coated onto a polyester film having a 1 mil thickness (obtained as Mylar from the E. I. du Pont de Nemours & Company) with a doctor blade to provide a 1.5 to 2 mil coating on the polyester film. The liquid coating transformed into a soft pressure-sensitive adhesive upon exposure to ambient conditions (about 25° C.) within about 5 seconds. For handling purposes, a release paper was then placed over the coating. The release paper was a clay coated sheet of paper with a silicone release agent overcoat. The sample was cut into strips 1 inch wide for testing purposes. The results of rolling ball tack (inches), 180° peel strength (ounces) and shear strength (hours) tests, both on freshly prepared samples and on samples allowed to age at 70° C. for about 5 days, are shown in the following table:

TABLE 1

| Sample No. | Tackifying resin | Poly(α-methyl styrene) | Block copolymer | Rolling ball tack (in.) | Fresh sample 180° peel strength (oz.) | Shear strength (hr.) |
|---|---|---|---|---|---|---|
| 1 | 52.5 | 20.0 | 27.5 | 8.0 | 152 | >300 |
| 2 | 40.0 | 25.0 | 35.0 | 0.5 | 69 | 189 |
| 3 | 47.5 | 20.0 | 32.5 | 0.5 | 99 | >168 |

The viscosities of these adhesives (1–3) are favorably shown in Table 2 as suitable for hot melt, pressure-sensitive adhesives:

TABLE 2

| Sample No.: | Viscosity at 177° C.[1] |
|---|---|
| 1 | 1850 |
| 2 | 3800 |
| 3 | 4050 |

[1] Brookfield Viscometer, No. 4 spindle, 20 r.p.m.

In these examples the 180° peel strength tests were conducted according to Method PSTC–1, revised in April of 1966, of the Pressure Sensitive Tape Council. This method is found in the Fifth Edition of "Test Methods for Pressure Sensitive Tapes," developed by the Pressure Sensitive Tape Council, 1201 Waukegan Road, Glenview, Ill. This test measures the average pull value required to peel the adhesive from the substrate at 180° angle in pounds per one inch width of the test sample. The shear strength was measured in this example according to the method described as PSTC–7 of the Pressure Sensitive Tape Council. In particular, it was measured by applying a 500 gram weight of 0.5 square inch of the sample and measuring the time in hours required for the tape to separate from the substrate. The rolling ball tack was determined according to PSTC–6 which involved measuring the distance in inches a prescribed ball rolled across a horizontally positioned adhesive coat after rolling down an inclined plane.

While certain representative embodiments and details have been shown for the purpose of illustrating the invention, it will be apparent to those skilled in this art that various changes and modifications may be made therein without departing from the spirit or scope of the invention.

What is claimed is:

1. A pressure-sensitive adhesive composition which comprises a mixture of (a) an unvulcanized elastomeric block copolymer having the general configuration A—B—A wherein each A is a non-elastomeric styrene polymer block having an average molecular weight of 2,000 to 100,000, the total block A content being from about 10 to about 50 percent by weight of the copolymer, and B is an elastomeric diene polymer block, selected from at least one of isoprene and 1,3-butadiene, having an average molecular weight from about 25,000 to about 1,000,000, said copolymer having a tensile strength at 25° C. in excess of about 200 pounds per square inch, (b) a compatible, thermoplastic tackifying resin containing carbon-to-carbon unsaturation therein and derived from hydrocarbons having from 5 to 8 carbon atoms and at least one carbon-to-carbon double bond therein selected from aliphatic hydrocarbons and alicyclic hydrocarbons, and (c) a poly(α-methylstyrene) characteristically having a viscosity at 60° C. in the range of about 100 to about 1000 centipoises said mixture comprising 20 to 30 weight percent of the poly(alpha-methyl styrene), about 25 to 35 weight percent of the unvulcanized block copolymer and from about 38 to about 53 weight percent of the thermoplastic hydrocarbon derived tackifying resin.

2. The composition according to claim 1 characterized by having a viscosity in the range of about 1000 to about 5500 centipoises at a temperature of about 175° C. where the diene polymer block of the unvulcanized block copolymer is of isoprene and the difference in glass transition temperatures between the copolymer's styrene and isoprene polymer blocks is at least about 100° C.

3. The composition according to claim 1 where, in the block copolymer, the styrene polymer block has a molecular weight in the range of about 5000 to about 30,000, the elastomeric diene polymer block has a molecular weight in the range of about 50,000 to about 150,000, the total block A content is about 12 to about 30 weight percent of the copolymer and the difference between the glass transition temperatures of the polymer blocks is at least about 100° C. and where the thermoplastic tackifying resin has a Ring and Ball softening point in the range of about 50° C. to about 150° C. and is derived from diolefins and olefins in a mole ratio of from about 20:80 to about 80:20.

4. The composition according to claim 3 where said thermoplastic hydrocarbon-derived tackifying resin is characterized by having a softening point in the range of about 80° C. to about 110° C. and is prepared by polymerizing a mixture comprising from about 20 to about 75 weight percent of piperylene and from about 80 to about 25 weight percent of 2-methyl - 2 - butene in the presence of anhydrous aluminum chloride at a temperature of from about 0° C. to about 50° C.

5. The composition according to claim 4 where said thermoplastic hydrocarbon-derived tackifying resin is modified by containing up to about 25 percent by weight units derived from piperylene dimers, piperylene trimers and other unsaturated hydrocarbons containing 4 to 6 carbon atoms.

6. The composition according to claim 5 comprising about 22 to about 28 weight percent of a poly(α-methylstyrene) characterized by having a viscosity at 60° C. of about 150 to about 900 centipoises, about 28 to about 30 weight percent of an unvulcanized block copolymer of isoprene-styrene-isoprene and about 40 to about 50 weight percent of said thermoplastic hydrocarbon-derived tackifying resin.

7. A method of preparing the composition of claim 1 which comprises heating the tackifying resin to liquification and mixing the poly(α-methylstyrene) therewith at about 120° C. to about 180° C., adjusting the temperature of the liquified mixture to about 150° C. to about 180° C., followed by mixing therewith the unvulcanized block copolymer with vigorous agitation.

8. The method according to claim 7 where the composition is applied as a hot melt at about 140° C. to about 190° C. to a substrate at a temperature of about 15° C. to about 50° C. where the hot melt sets up on the substrate and transforms into a pressure-sensitive adhesive within about 5 seconds.

References Cited
UNITED STATES PATENTS

| 3,231,635 | 1/1966 | Holden | 260—876 B |
| 3,265,765 | 8/1966 | Holden | 260—876 B |
| 3,325,430 | 6/1967 | Grasley | 260—876 B |
| 3,429,951 | 2/1969 | Childers | 260—876 B |
| 3,476,829 | 11/1969 | Gruver | 260—876 B |
| 3,632,540 | 1/1972 | Unmuth | 260—876 B |
| 3,637,554 | 1/1972 | Childers | 260—876 B |
| 3,658,740 | 4/1972 | Marrs | 260—876 B |

PAUL LIEBERMAN, Primary Examiner

U.S. Cl. X.R.

117—138.8 F; 260—33.6 A, 880 B